United States Patent [19]

Besenmatter

[11] 4,203,661
[45] May 20, 1980

[54] OPTICAL SYSTEM

[75] Inventor: Walter Besenmatter, Vienna, Austria

[73] Assignees: Ing. Karl Vockenhuber; DDr. Raimund Hauser, both of Vienna, Austria; part interest to each

[21] Appl. No.: 940,293

[22] Filed: Sep. 7, 1978

[30] Foreign Application Priority Data

Sep. 16, 1977 [AT] Austria ............................ 6661/77

[51] Int. Cl.² .................. G03B 7/08; G03B 13/02; G03B 9/02
[52] U.S. Cl. .................................. 354/53; 354/42; 354/196; 354/273
[58] Field of Search ............... 352/140, 141, 196, 198, 352/40, 42, 273, 59, 53, 23

[56] References Cited

U.S. PATENT DOCUMENTS

| | | | |
|---|---|---|---|
| 3,127,809 | 4/1964 | Denk | 354/42 X |
| 3,541,941 | 11/1970 | Barr et al. | 354/196 X |
| 3,587,431 | 6/1971 | Höller | 354/53 X |
| 3,605,596 | 9/1971 | Vockenhuber et al. | 354/23 |
| 4,064,520 | 12/1977 | Freudenschuss et al. | 354/196 |

FOREIGN PATENT DOCUMENTS

| | | | |
|---|---|---|---|
| 1043622 | 9/1966 | United Kingdom | 352/141 |
| 1054994 | 1/1967 | United Kingdom | 354/196 |

OTHER PUBLICATIONS

1960 Leica Photography, vol. 13, No. 3, One Scale, Many Uses, pp. 28-29.
1961 Leica Photography, vol. 14, No. 4, Leica School Notebook, pp. 14-15.

Primary Examiner—Donald A. Griffin
Attorney, Agent, or Firm—Fleit & Jacobson

[57] ABSTRACT

In an optical system having a lens with adjustable focal length, an adjustable aperture plate, and a light-meter device attached to the aperture plate adjustment device, apparatus for connecting the focal-length adjustment device so that the aperture opening is limited by the focal length adjustment device. Additionally, a signalling device emits a signal of the aperture opening defined by the focal-length adjusting device is smaller than the opening if the aperture plate controlled by the light-meter device. In another embodiment an additional variable aperture is located in front of the light-meter device and the adjustment device for this additional aperture is also connected to the focal-length adjustment device.

19 Claims, 14 Drawing Figures

| DIN APERTURE OPENING | 1.2 | 1.4 | 2.4 | 3.7 | 5.0 | 7.0 | 9.7 | 11.0 | 16.0 | 22.0 | 32.0 |
|---|---|---|---|---|---|---|---|---|---|---|---|
| LIMITING FOCAL LENGTHS | 9.80 | 10.58 | 13.85 | 17.20 | 20.00 | 23.66 | 27.85 | 29.66 | 35.77 | 41.95 | 50.59 |
| 17 | 46.64 | 59.03 | 186.57 | 455.49 | 809.77 | 1587.14 | 3016.30 | 3919.27 | 8292.00 | 15677.06 | 33168.00 |
| 23 | 11.72 | 14.83 | 46.86 | 144.41 | 203.40 | 398.67 | 757.66 | 984.47 | 2082.86 | 3937.90 | 8331.42 |

FIG. 13

OPTICAL SYSTEM

BACKGROUND OF THE INVENTION

The present invention relates to optical systems and, more particularly, to an optical system consisting, first, of a lens with adjustable focal length and an aperture plate whose opening is variable so as to maintain constant the amount of light leaving the lens and, secondly, of a light-meter device which is attached to the aperture plate adjustment device.

For those optical systems which are used especially in photographic or cinematographic cameras, it is desirable to indicate to the user of the system the limits within which an object must reside, in order to maintain a sharp image of the object in an image plane, as defined by the adjustment data provided by the system. It is known that the sharpness of an object image depends on the exactness of the focus adjustment and this, in turn, on the diameter of the permissible blur range in the image plane, through which a definite depth-of-focus range is defined in the object space. For pancratic lenses this depth-of-focus range becomes smaller as the focal length increases, therefore the danger arises that, with fixed focus adjustment, the diameter of the blurred object image exceeds the permissible diameter of the blur range. This danger is lessened if the lightness of the object is very great, whereby the amount of light leaving the optical system is kept constant by means of an aperture plate controlled by an exposure meter, which aperture plate is open only slightly if the object is very light.

Austrian patent document Nos. 329,375 and 240,620 describe constructions with whose help, depending on the adjusted focal length and the opening of the aperture plate, respectively, or depending only on the focal length, the system is focused so that the object is continually in the depth-of-focus area. Also, there are already cameras, for example, that are described in the Austrian patent document No. 280,779, which corresponds to U.S. Pat. No. 3,587,431, which monitor the focal length and the aperture value through coupling devices and which indicate the position of the object in reference to the depth-of-focus area in the viewfinder. However, cameras, which are provided with these devices, must have additional control elements, which tax the electronic switching measures. On the other hand the first-named focus-adjustment aids depend on subjective judgements of the operator and, therefore, do not necessarily function correctly at all times.

SUMMARY OF THE INVENTION

For these reasons the present invention provides a focusing aid for the originally mentioned optical system, which requires the smallest expenditure in technical construction and works simply and flawlessly in operation. In this regard, the user of the system may be signalled if a pregiven depth-of-focus area is left, when the focal length is enlarged due to the lightness of the object. This can be done by means of a visual or acoustic indicator device, or may be corrected automatically by a device connected directly to the operation of the optical system.

The present invention recommends that the aperture plate adjustment device, or an adjustment device for another aperture placed in front of the light meter device, be connected to a focal-length adjustment device so that its aperture can be limited by this focal-length adjustment device. Additionally, a signalling device is provided which emits a signal if the opening of the aperture plate defined by the focal-length adjustment device, or the additional aperture, is smaller than the opening of the aperture plate controlled by the light-meter device. The coupling between the focal-length adjustment device and the adjustment device for the aperture plate itself entails the smallest expenditure in construction. If the focal length is enlarged with a pre-given object lightness and, therefore, a definite opening of the aperture plate, the moment of the reduction in the opening of the aperture plate caused by the focal-length adjustment device can be determined by means of a comparator.

Another way of carrying out the invention involves placing another aperture, which is controlled only by the focal-length adjustment device, in the ray-path of the aperture plate.

In the situation where the light-meter device is provided with its own lens, the mechanical expenditure is indeed somewhat greater, but the present invention still provides acceptable results. Here either a single aperture, placed in front of a photoelectric converter, can be controlled by both the light-meter device and the focal-length adjustment device or the focal-length adjustment device can have its own aperture in the ray-path of the light meter. In either case, above a certain focal length the light-meter device will receive less object light than a pre-given constant value, whereby the signalling device is activated.

Particularly advantageous is the use of the optical system in a camera in which the exposure-meter mechanism controls an underexposure indicator, preferably visible in the viewfinder of the camera. According to the invention, the signal of the signalling device should activate the underexposure indicator.

BRIEF DESCRIPTION OF THE DRAWINGS

Other advantages and characteristics of the invention can be seen with the aid of the descriptions of the exemplary constructions presented schematically in the diagrams.

DETAILED DESCRIPTION OF THE INVENTION

Figure 1:
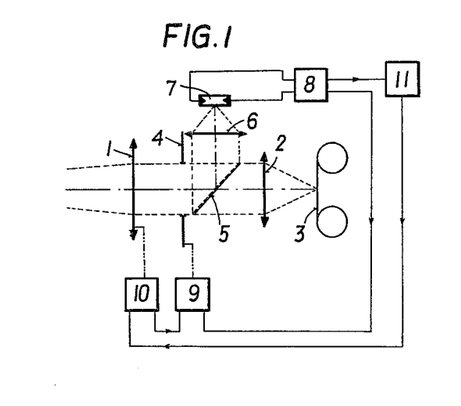
FIG. 1 is a schematic representation of a first embodiment of the invention.

FIG. 1 presents an optical system which is constructed having a front lens 1, of variable enlargement capability, and a basic lens 2, of fixed focal length. The basic lens 2 projects an object in a plane 3, in which, for example, the film is placed. In the afocal part of the system a semi-transparent or pellicle mirror 5 is placed next to an aperture plate 4. This mirror 5 directs the rays coming from the object to an exposure-meter system, comprised of a lens 6, a photoelectric converter 7, and an automatic control loop 8. By means of an aperture drive 9, for example a galvanometer, a stepping motor, or the like, the automatic control loop 8 regulates the opening of the aperture 4 in such a way that the amount of light falling on the photoelectric converter 7 and the film 3 remains constant. The other input end of the aperture drive is connected to a focal-length adjustment device 10 for the front lens 1. In this manner, the opening of the aperture plate 4 will be influenced, depending on how the focal length is adjusted. Various constructions of focal-length adjustment devices and/or gearing for the aperture are described below with the aid of FIG. 6 through FIG. 12.

A signalling device 11 is connected to the automatic control loop 8 and is activated if the amount of light falling on the converter 7 falls below a definite threshold. In the diagrammatic example of FIG. 1, the result would be underexposure of the film image. In the arrangement of FIG. 1, the signalling device 11 gives a signal to the focal-length adjustment device 10, through which a smaller focal length and thus an opening of the aperture plate results, until the danger of underexposure is overcome.

Figure 2:
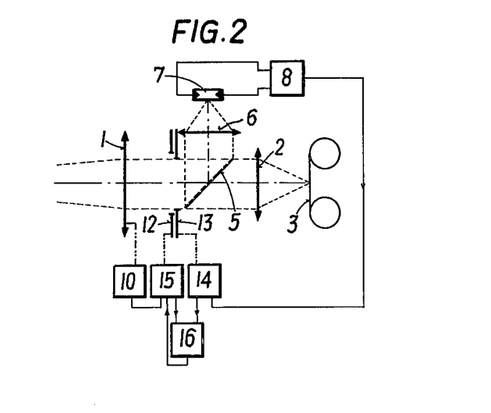
FIG. 2 is a schematic representation of another embodiment of the invention.

FIG. 2 shows a substantially similar arrangement, with the sole difference that another aperture is provided that has its stopping down dependent on the focal length of the front lens, as controlled by the focal length adjusting device. This additional aperture is designated with the number 12 in FIG. 2, the aperture plate with the number 13, whereby the parts with the same function as in the example of FIG. 1 are provided with the same reference numerals.

The control of the system when underexposure is detected by the exposure-regulating mechanism is such that one input end of the signalling device 16 is connected with an aperture-drive device 14 for the aperture plate 13, while the other input end of the signalling device is connected with an aperture-drive device 15 for the additional aperture 12. The signalling device in a way "compares" the openings of both apertures and effects an enlargement of the opening of the additional aperture, if this opening, determined by the focal length, is smaller than the opening of the aperture plate 13, which is controlled by the exposure measuring circuit. It would be advantageous in this case to have a special indicator so as to bring to the user's attention the fact that the depth-of-focus area was being left with the given adjustment (compare the exemplary construction according to FIG. 3), or that an adjustment of the focal length to a shorter one is necessary, as in the embodiment of FIG. 1.

Figure 3:
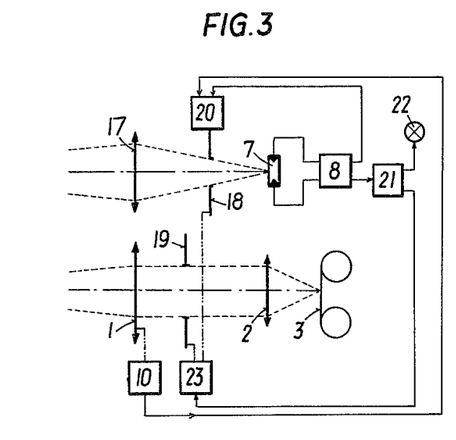
FIG. 3 is a schematic representation of the present invention employed on a camera having a separate lens for the light-meter.

FIG. 3 shows how the invention is applied to a camera in which the optical system is constructed of two lenses with roughly parallel axes. While the lenses 1, 2, as in the examples according to FIGS. 1 and 2, project the light coming from the object onto the film 3, another lens 17 is provided to determine the brightness of the object. This lens reflects an image of the object onto the photoelectric converter 7. In order to again keep constant the amount of light falling onto the converter 7 and/or onto the film 3, apertures 18 and 19, which have variable openings and operate synchronously, are placed in the ray-path of the lens 17 and the lenses 1 and 2. While aperture 18 is controlled directly by the automatic control loop 8 through the drive 20, the variation of aperture 19 is effected by means of a gear system, which is schematically presented in FIG. 3 by means of dashed lines. The alteration of the opening which depends on the focal length is effected by the focal-length adjustment device 10 operating on the aperture drive 20.

If the aperture 18, and thus aperture 19, is set at an opening such that underexposure of the film 3 would result, the signalling device, 21 connected to the exposure control loop 8, gives a signal to both an indicating device 22 and a coupling means 23, which then breaks the gear connection between apertures 18 and 19. This guarantees that when the focal length is further extended and aperture 18 is thereby shut there will be no underexposure of the film. On the other hand, the user of the system is warned by the indicating device 22 that the size of the original depth-of-focus area is no longer reached. The indicating device 22 could, for example, be comprised of a light emitting diode placed in the viewfinder of the camera.

Figure 4:
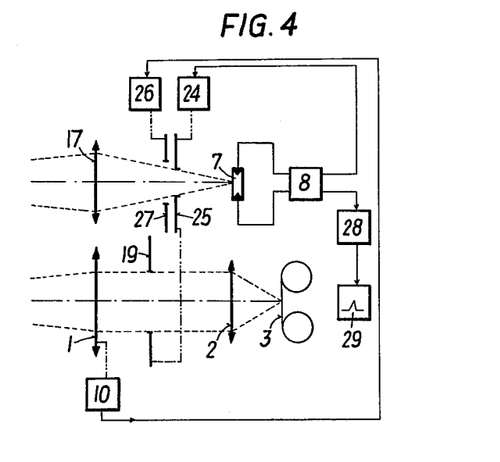
FIG. 4 is a schematic representation of another embodiment of the invention utilized in a camera, as shown in FIG. 3.

FIG. 4 shows a variation which is similar in construction to that of FIG. 3, with a difference being that the aperture placed in front of the photoelectric converter 7 now consists first of an aperture 25, regulated by the control loop 8 and aperture drive 24, and a second aperture 27 controlled by aperture drive 26. By connecting aperture 25 by gears with the aperture plate 19 of the lenses 1 and 2, the focal-length adjustment device 10 can thus control the opening of aperture 27. The signalling device 28 receives a signal when there is a danger of underexposure of the film 3 and, in this example, shuts off the camera through a circuit-breaker 29.

Figures 5, 8:
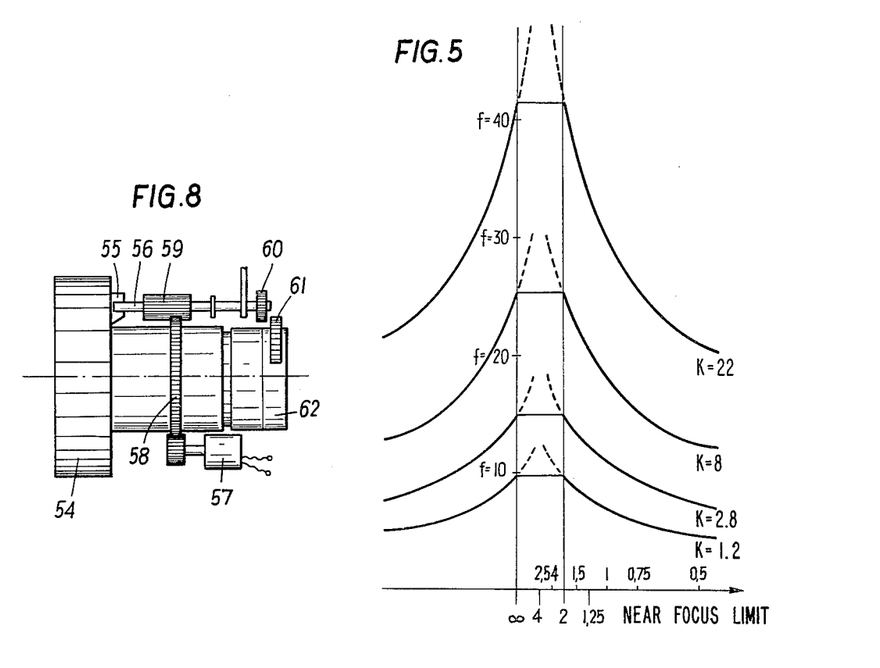
FIG. 5 is a graphical representation of the manner in which the object space gives a sharp image, as a function of the aperture and the focal-length.
FIG. 8 is a side elevation of a portion of a camera optical system employing the invention.

FIG. 5 uses a focal-length/distance graph to show at what aperture and focal length the depth-of-focus area will be departed from. Here, a permissible blur range with a diameter of 20 μm is assumed. With an assumed depth-of-focus area from 2 m. to infinity, the result is that, for example, with an aperture setting of 8 the depth-of-focus area is reduced from a focal length of 25 mm. Thus, for example, at the same aperture setting and with a focal length of 30 mm, the limit of depth-of-focus is no longer 2 m. but rather 3 m. Or with a focal length of 40 mm the brightness of the object would for example require an aperture of 22 in order to achieve a depth-of-focus area between 2 m. and infinity. According to the invention, the aperture plate, or the additional aperture, would always be kept at a value such that even with increasing focal length the depth-of-focus area (for example, between 2 m. and infinity) is achieved.

Figure 6:
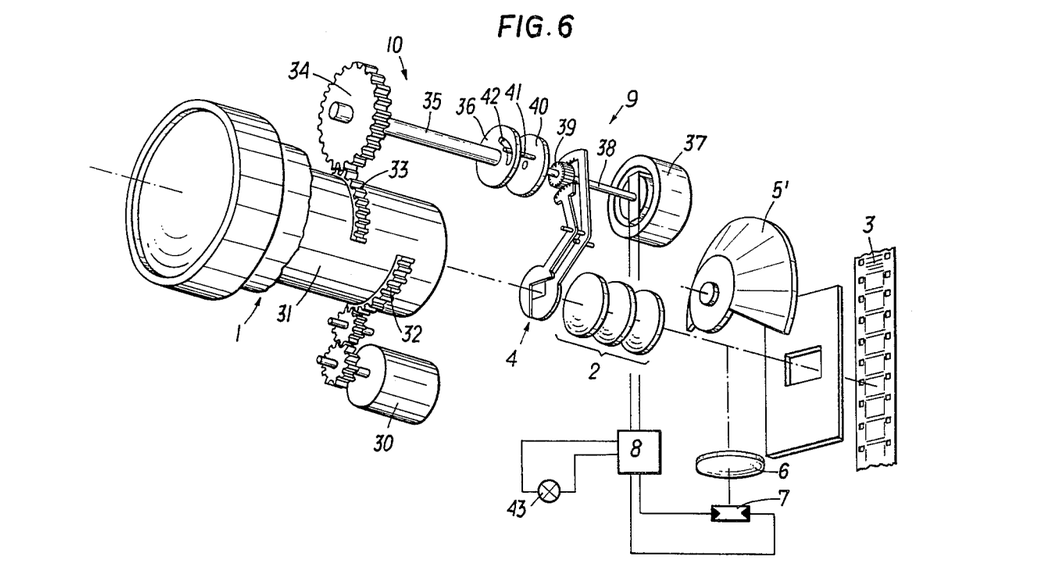
FIG. 6 is a perspective of a mechanical assembly of the invention embodied in a film camera.

FIG. 6 shows a technical solution for an embodiment constructed according to the invention and having an optical design according to FIG. 1. The focal-length adjustment for the front piece 1 is effected by a motor 30. A geartooth segment 33, which is thrown into gear with a driver 34 on an intermediate shaft 35, is placed on the tube 31 of the front piece 1, in addition to a geartooth segment 32 for engaging the motor drive. Together with a disc 36, the geartooth segment 33, driver 34, and shaft 35 form the focal-length adjustment device 10.

The aperture drive 9, which is formed by a galvanometer 37, a shaft 38, and a drive 39 on the shaft 38, is coaxial to the shaft 35. The aperture plate 4 is constructed of two surfaces, each of which can be rotated around one axis and each of which has gear-tooth elements which are thrown into gear with the driver 39. Opposite to the disc 36 of the focal-length adjustment device 10 is a disc 40 fixed to the shaft 38. The disc 40 carries a pin 41. The pin 41 sticks into a slot 42 in the disc 36.

Should the object brightness change when the focal length is set at the smallest possible value, the galvanometer 37 adjusts the aperture 4 to the correct value, whereby the pin 41 freely moves in the slot 42. Should the focal length be adjusted to a larger value, the slot 42 limits the path of movement of the pin 41 and, thereby limits the opening of the aperture 4. Should the object brightness require a greater aperture opening that that pre-given by the focal-length adjustment device 10, an underexposure signal arises through a warning light 43, which is controlled by the automatic control loop 8.

Figure 7:
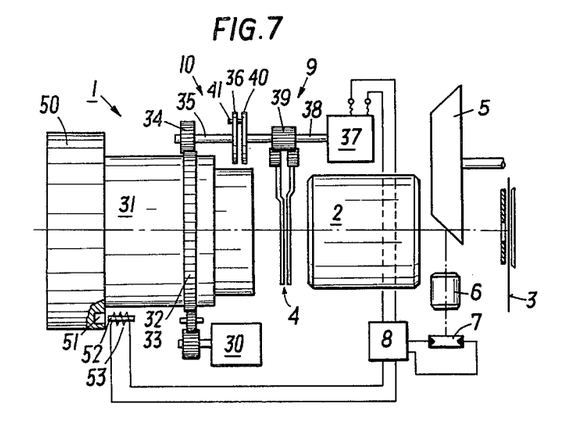
FIG. 7 is a side elevation, partially schematic, of an embodiment of the invention used in the optical system of a camera.

FIG. 7 shows essentially the same arrangement as in FIG. 6. A difference in comparison to the above-described construction is that a lens 31 is provided with the possibility of front lens adjustment. The front lens 1 is placed in a mounting 50 and must be set at a certain position to achieve the definite depth-of-focus range. This is defined by means of a groove 51 in the mounting 50. In order that the user does not inadvertently lose this setting, a pin 52 is inserted in the groove 51 and holds the mounting 50 in this position. As soon as a underexposure signal is emitted by the automatic control loop 8, a solenoid 53 is energized and pulls the pin 52 out of the groove. The range of sharpness can then be adapted to the setting data pre-given by the aperture and the focal length by changing the setting of the front lens.

FIG. 8 shows an exemplary construction of the invention in which an adjustment of the aperture dependent on the focal length is made possible only when the front lens has the setting coordinated with the desired depth-of-focus range. For this purpose a mounting 54 for the front lens has a cam 55 of which an intermediate shaft 56 is placed under pressure from a spring. Should the setting of the front lens not correspond to the value required for the desired depth-of-focus range, the momentum coming from a focal-length adjustment motor cannot be conveyed to a geartooth segment 61 of an aperture ring 62 through a spur gear 58 and drivers 59, 60. This is only possible if the cam 55 engages the driver 60 with the geartooth segment 61, in which the setting of the front lens is set at the defined depth-of-focus range.

Figure 13:
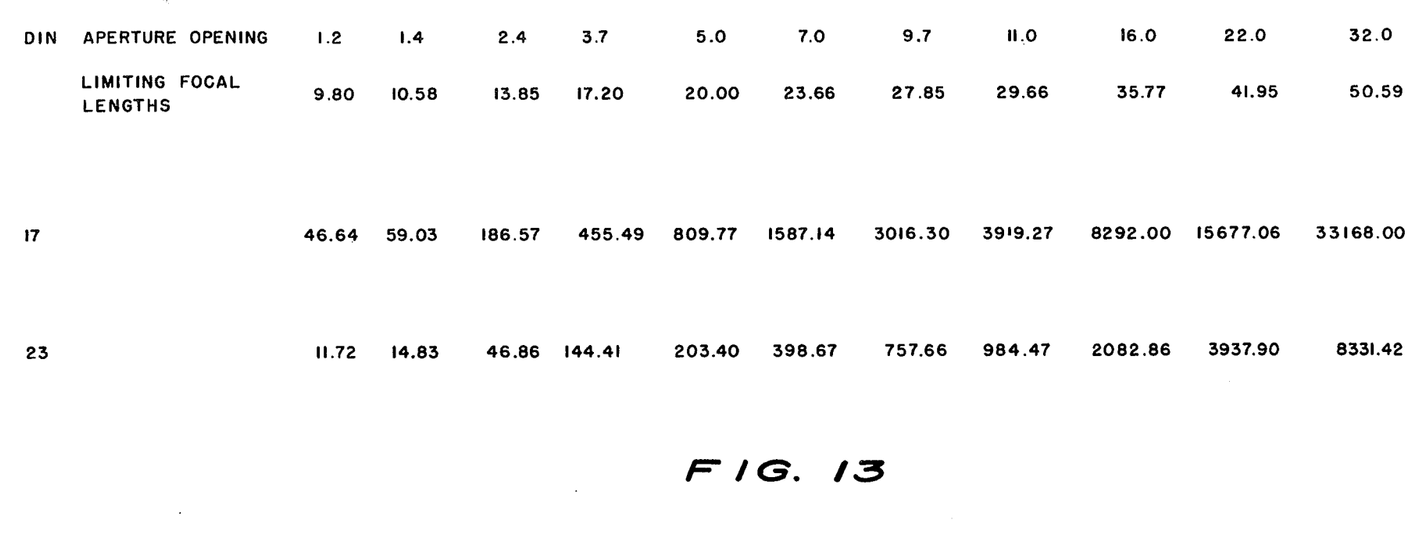
FIG. 13 is a chart of minimum luminances listed for various individual aperture openings and limiting focal lengths.

As was already mentioned, the construction described by the invention is especially advantageous when used with cameras. One can see from the two rows in FIG. 13 just which minimum luminances in "apostilb" must be emitted by the object in order to ensure that the required depth-of-focus range of from 2 m. to infinity is reached with the individual aperture openings and limiting focal-lengths. A film speed of 17 DIN was assumed for the first row and 23 DIN for the second row.

A comparison can be made with these luminance values from the German Industrial Standards (DIN) 5.035, page 2, to determine in what interior spaces one can film with the specific setting values. For example, with a limiting focal length of 20 mm. and a 5.0 opening and using 17 DIN film, it is possible to film in rooms where the use of this film is necessary, for illumination as in drawing rooms. With smaller focal length, for example 10 mm, it is then possible to film in garages. With the faster 23 DIN film, it is possible with a focal length of 30 mm. to film in rooms which for example are about as bright as experimental and testing chambers and yet still achieve a depth-of-focus from 2 m. to infinity.

Figure 9:
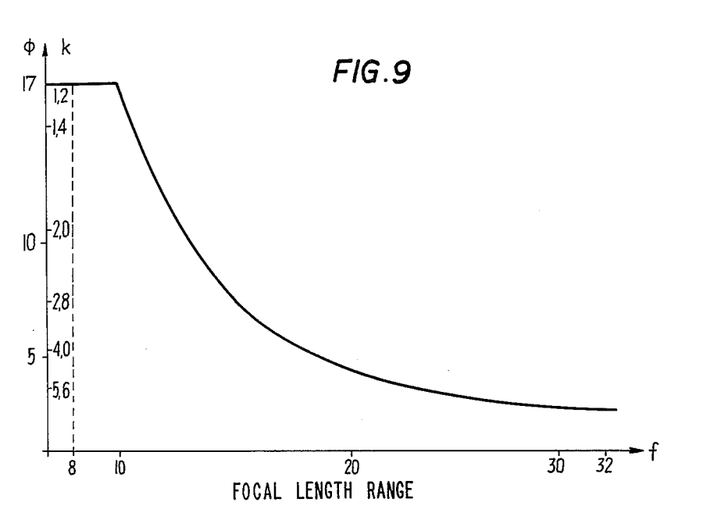
FIG. 9 is a graphical representation of a cam surface profile for use in the invention.

FIG. 9 shows in diagram-form how an automatic focusing cam for the additional aperture must be constructed in order to keep the depth-of-focus range, for example from 2 m. to infinity during adjustment of the focal length with a lens opening of 1:1.2 and a focal-length range from 8 to 32 mm. One can see from this diagram that the additional aperture begins to function only with a focal length of 9.8 mm. This should be compared with the above table.

Figure 10:
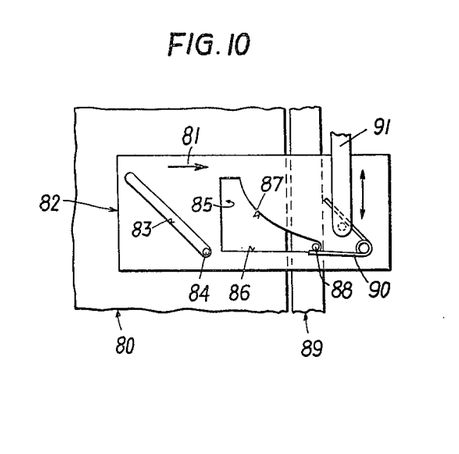
FIG. 10 is a side elevation of a portion of the focussing means of a camera employing the invention.

FIG. 10 shows a solution in which the aperture setting determined by the focal length can be effected in dependence on the front lens setting. A carrier 82 for the automatic focusing cam can be shifted (arrow 81) along the focal length control tube 80, which is shown in the extended position. This cam carrier has a slot 83 in which a pin 84, connected with the focal-length adjustment parts, moves. As the carrier 82 shifts, the translatory motion is transformed into a rotational motion of the mounting part which carries the pin 84.

Next to the guide slot 83, the carrier 82 has a guide slot 85 with a curve 86 and a curve 87, the latter having in the example the shape represented in FIG. 9. A cam follower 88, which is set on a diaphragm adjustment ring 89, is coordinated with these curves. A spring 90 presses the cam follower 88 either on the curve 87 or on the curve 86.

If the front lens is set at a definite distance, which is coordinated with the desired range of sharpness, the spring 90 presses the cam follower 88 on the control curve 87. In this way the aperture changes its opening by means of shifting the carrier 82 during the variation of the focal length.

By shifting the front lens from the defined portion, a lever 91 is moved, which transforms the force action of the spring 90 in such a way that now the cam foller 88 lies on curve 86. This curve 86 is essentially a straight line along which the cam follower 88 glides and which keeps the additional aperture at the maximum opening during the focal-length adjustment.

Figure 11:
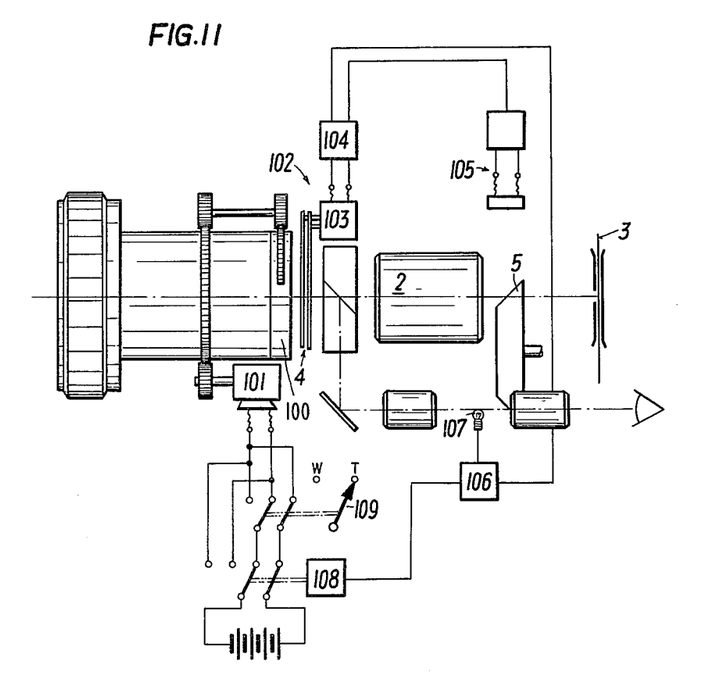
FIG. 11 is a side elevation, partially schematic, of the optical system of a camera employing the invention.

FIG. 11 shows a form of construction with which no underexposure can occur, in spite of additional aperture control. The control of the additional aperture 100 is directly derived from the adjustment of focal length by means of the motor 101. The drive of the aperture plate 102 is effected through the galvanometer 103 which is connected to the automatic control loop 104. The automatic control loop 104 receives the characteristic exposure magnitudes from the photoelectric converter 105 according to a known techniques.

When the aperture opening of the additional aperture 100 is smaller than that of the aperture plate 102, the underexposure signal is made through the signalling device 106 and a small light 107 in the viewfinder. But in order to avoid from the outset the possibility of underexposure, the signalling device 106 controls a circuit-breaker 108 in the supply circuit of the focal-length adjustment motor 101.

Under normal conditions, i.e., when there can be no underexposure of the film 3, the circuit-breaker 108 assumes the position shown in FIG. 11. In this case the polarity of the motor 101 can be reversed by means of the "zoom balance" control 109 in order to represent the choice between the tele-focal-length "T" and the wide-angle-focal-length "W". As soon as the underexposure signal is given by the signalling device 106, the circuit-breaker 108 reverses the polarity of the motor 101 to the wide-angle setting, with which the desired range of sharpness is achieved.

Figure 12A:
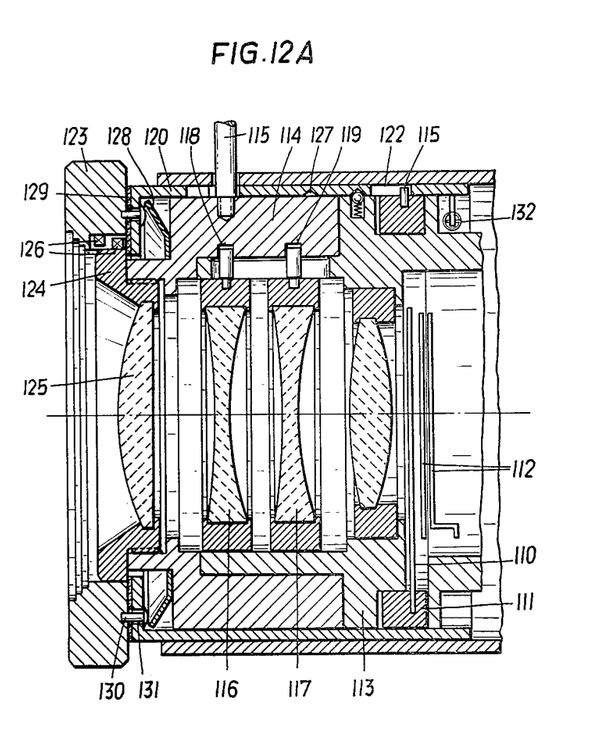
FIG. 12A is a cross-sectional view of a camera optical system utilizing the invention and FIG. 12B is a detail of a portion of the optical system of FIG. 12A.

Finally, FIGS. 12A and B illustrate a housing construction in which the operation of the additional aperture can be controlled by means of the front lens setting, similar to the arrangements presented in FIGS. 7 and 8. This additional aperture is designated as 110 in FIG. 12 and is housed in a diaphragm ring 111. When ring 111 is turned, the aperture is closed according to a law presented in the example of FIG. 9. Immediately adjacent to the additional aperture 110 in the afocal ray-path of the lens is an aperture plate 112, the control of which is not represented for reasons of simplicity and because it is not essential to the invention.

The diaphragm ring 111 is placed so that it can be rotated around a stationary tube of the front piece. A control tube 114 has an adjusting lever 115 with whose help the entire tube 114 can be rotated when the focal length is adjusted. In this case the optical elements 116 and 117 glide along the optical axis according to the pre-established laws of movement given by the automatic focusing cams 118 and 119. The rotating movement of the control tube 114 is also conveyed to an aperture tube 120 (see also FIG. 12B) by means of an adjusting lever and curve section 121. Finally, the aperture tube has a longitudinal slot 122, in which the diaphragm ring 111 is engaged. In the position presented in FIG. 12A, the turning of the focusing ring 123 has no effect in changing the position of the front piece 125 in the housing 124.

Figure 12B:
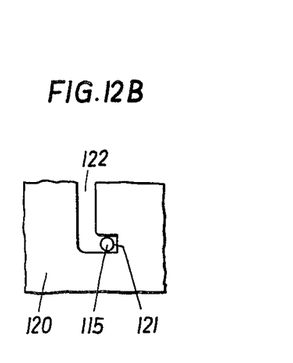

The ring 123 is coupled to the housing 124 through the teeth 126 only when this ring is axially shifted against the operation of a spring disc 128. At the same time the aperture tube is shifted axially until its position is determined by the notch 127. In this setting the adjusting lever is placed in the curve segment 122, which runs transverse to the optical axis, so that focal-length adjustment has no effect on the alteration of the opening of the additional aperture. Since a slide coupling 129 is provided between the focusing ring 123 and the aperture tube 120, whereby the accompanying pins 130 glide along circular slots 131 of the aperture tube, this adjustment arrangement as well applies no drive to the aperture ring 111. Here a tensile spring 132 applies tension to the aperture tube 120 in a position which maintains the maximum opening of the additional aperture 110.

The device described by the invention is not limited to use with camera lenses. For example, application of the additional aperture is conceivable for telescopes, enlargers, and other optical devices in which it is possible to adjust the focal length of the optical system.

What is claimed is:

1. An optical system comprising a lens with adjustable focal length and an aperture plate having a variable opening so as to maintain constant the amount of light leaving the lens and a light-meter device which is attached to an aperture plate adjustment device, characterized by the fact that the aperture plate adjustment device (9, 14, 23) is attached to a focal-length adjustment device (10;57;80;101;115) so that its aperture can be limited by this focal-length adjustment device, and by the fact that a signalling device (11,16,21,28, 43,53,106) is provided which emits a signal if the opening of the aperture plate defined by the focal-length adjustment device is smaller than the opening of the aperture plate (4;13;19;102;112) controlled by the light-meter device.

2. An optical system according to claim 1, characterized by the fact that the amount of light coming through the lens is conducted to the light-meter device (7,105) by a known technique and by the fact that an additional aperture (12,62,89,100,110) is placed in the same ray-path as the aperture plate (13,102,112).

3. An optical system according to claim 1, characterized by the fact that the light-meter device (7) is placed in the ray-path of a second lens (17) whose optical axis is substantially parallel to the optical axis of the first lens (1), and by the fact that an adjusting device (20) for another aperture (18), which is connected to the focal-length adjustment device (10), is coupled with an adjustment device (23) for the aperture plate (19) through a gear system.

4. An optical system according to claim 1, characterized by the fact that the light meter device (7) is placed in the ray-path of a second lens (17) whose optical axis is substantially parallel to the optical axis of the first lens (1), and by the fact that a second aperture (27), which is connected to the focal-length adjustment device (10), and a third aperture (25) coupled to the aperture plate (19) through a gear system are placed in the ray-path of the second lens.

5. An optical system according to claims 3 or 4, characterized by the fact that said adjustment device arranged (23) between the aperture (18) controlled by the photoelectric converter (7) and the aperture plate (19) can be disengaged by means of the signal of the signalling device (21).

6. An optical system according to claims 1 or 3, further comprising a limiting mechanism for the opening of the aperture plate (4) is formed by a first catch (42), moveable with the focal-length adjustment device (10), and a countercatch (41), moveable with the opening of the aperture plate (4) or the other aperture, is coordinated with the first catch.

7. An optical system according to claim 6, characterized by the fact that focal-length adjustment device (101) has an input end connected to the signal of the signalling device (106) and a device (108) activated by this signal for setting the shortest total focal length.

8. An optical system according to claim 7, characterized by the fact that the focal-length adjustment device (101) has an input end connected to the signal of the signalling device (106) and a device (108) activated by this signal for setting the shortest total focal length.

9. An optical system according to claim 1, characterized by the fact that the lens has a front part (54) which for the purpose of distance setting is coordinated with an adjustment device for movement of the part along the optical axis and by the fact that a coupling (60,61) which can be disengaged by the front part adjustment device is provided between the focal length adjustment device and the aperture (62) which can be connected to it.

10. An optical system according to claim 1, characterized by the fact that in accordance with known techniques the lens has a front part (125) which for purposes of distance setting is coordinated with an adjustment device for movement of the part along the optical axis and by the fact that an adjustment device (86,122) which can be switched on by the front part adjustment device (91,123) is provided for fully opening the aperture (80,110) connected to the focal-length adjustment device.

11. An optical system according to claim 1, characterized by the fact that the lens has a front piece (50) with which an adjustment device for the movement of the piece along the optical axis is coordinated for purposes of distance setting and by the fact that a locking device (51,52) which can be disengaged by the signal of the signalling device (53) is provided for the front-piece adjustment device.

12. A camera with an optical system according to claims 1 or 2, 3, 4, 9, 10 or 11, characterized by the fact that the exposure-meter mechanisms (105) control an underexposure indicator (22,107), visible in the viewfinder of the camera, and by the fact that the signal of the signalling device (21,106) activates the underexposure indicator.

13. An optical system consisting, first, of a lens with adjustable focal length and an aperture plate whose opening is variable so as to maintain constant the amount of light leaving the lens and, secondly, of a light-meter device which is attached to the aperture plate adjustment device, characterized by the fact that an adjustment device (9, 14, 23) for said aperture plate and an adjustment device (15,20;26;60;61;88;111) for a second aperture (12;18;27;62;89;160;110) placed in front of the light-meter device (7,105) are attached to a focal-length adjustment device (10;57;80;101;115) so that said apertures can be limited by this focal-length adjustment device, and furthermore by the fact that a signalling device (11,16,21,28, 43,53,106) is provided which emits a signal if the opening of either the aperture plate defined by the focal-length adjustment device or the additional aperture is smaller than the opening of the aperture plate (4;13;19;102;112) controlled by the light-meter device.

14. An optical system according to claim 13, characterized by the fact that a limiting mechanism for the opening of said second aperture (89) is formed by focusing cams (87) driven by the focal-length adjustment device (80) which are engaged by the leaves of said second aperture (89).

15. An optical system according to claim 14 characterized by the fact that the steering cam (87) has an extension (85,122) which extends over the full adjustment range and which has a limiting control surface (86) defining the full opening of the second aperture (89), and by the fact that at least one cam key (88,115) is provided which is connected to the leaves and can be tensionally thrown into gear with the limiting surfaces of the extension.

16. An optical system according to claim 15 characterized by the fact that the cam key (88,115) can be thrown into gear with the front-piece adjustment device (91,123) and can be joined by the front-piece adjustment device to the limiting surface defining the full opening of the aperture against the action of a spring (90,128).

17. An optical system according to claim 13, characterized by the fact that the lens has a front part (125) which for the purpose of distance setting is coordinated with an adjustment device for movement of the part along the optical axis and by the fact that an adjustment device (86,122) which can be switched on by the front part adjustment device (91,123) is provided for fully opening the aperture (80,110) connected to the focal-length adjustment device.

18. An optical system according to claim 13, characterized by the fact that the lens has a front piece (50) with which an adjustment device for the movement of the piece along the optical axis is coordinated for purposes of distance setting and by the fact that a locking device (51,52) which can be disengaged by the signal of the signalling device (53) is provided for the front-piece adjustment device.

19. An optical system according to claim 13, characterized by the fact that the lens has a front part (125) which for purposes of distance setting is coordinated with an adjustment device for movement of the part along the optical axis and by the fact that an adjustment device (86, 122) which can be switched on by the front part adjustment device (91, 123) is provided for fully opening the aperture (80, 110) connected to the focal length adjustment device and further including a limiting mechanism for the opening of said second aperture (89) formed by a focusing cam (87) driven by the focal length adjustment device (80) which is engaged by the leaves of said second aperture (89), and wherein the focusing cam (87) has an extension (85, 122) which extends over the full adjustment range and which has a limiting control surface (86) defining the full opening of the second aperture (89), and by the fact that at least one cam key (88, 115) is provided which is connected to the leaves and which can be tensionally thrown into gear with the limiting surfaces of the extension.

* * * * *